United States Patent
Lee et al.

(10) Patent No.: US 11,416,756 B2
(45) Date of Patent: Aug. 16, 2022

(54) SYSTEMS AND METHODS FOR PHYSIOLOGICAL SENSING FOR PURPOSES OF DETECTING PERSONS AFFECTIVE FOCUS STATE FOR OPTIMIZING PRODUCTIVITY AND WORK QUALITY

(71) Applicant: FUJIFILM Business Innovation Corp., Tokyo (JP)

(72) Inventors: Matthew Lee, Mountain View, CA (US); Hideto Oda, Cupertino, CA (US); Sumeet Jain, Atlanta, GA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 1214 days.

(21) Appl. No.: 15/901,885

(22) Filed: Feb. 21, 2018

(65) Prior Publication Data

US 2019/0258944 A1    Aug. 22, 2019

(51) Int. Cl.
*G06N 5/04* (2006.01)
*G06Q 10/06* (2012.01)
*G06N 20/00* (2019.01)

(52) U.S. Cl.
CPC ........... *G06N 5/04* (2013.01); *G06N 20/00* (2019.01); *G06Q 10/063114* (2013.01)

(58) Field of Classification Search
None
See application file for complete search history.

(56) References Cited

U.S. PATENT DOCUMENTS

| 9,155,460 B2* | 10/2015 | Steinmetz | A61B 5/1113 |
| 2008/0091515 A1* | 4/2008 | Thieberger | G06Q 10/04 |
| | | | 705/7.11 |
| 2011/0307293 A1* | 12/2011 | Smith | G06Q 10/0635 |
| | | | 705/7.28 |

(Continued)

OTHER PUBLICATIONS

Kumar, Gaurav; "Performance analysis of multimodal biometric systems—An automated statistical approach"; University of Windsor (Canada). ProQuest Dissertations Publishing, 2009. MR57560. (Year: 2009).*

(Continued)

*Primary Examiner* — Leland Marcus
(74) *Attorney, Agent, or Firm* — Procopio, Cory, Hargreaves & Savitch LLP

(57) ABSTRACT

A system that infers and detects how focused a worker is on work tasks, based on physiological parameters collected using wearable and environmental sensors. The system can identify whether a worker is in a focused state of flow, the affective state in which the worker's mind is fully immersed and actively engaged in their task. The system can also identify whether the worker is anxious (where the task demands/difficulty is too high relative the worker's skills) or bored (where the task is too easy). Once the focus state is detected, the information can be used in various applications for optimizing the worker's tasks and work quality such as monitoring task mastery, interventions to improve worker focus (e.g., recommending breaks, reassigning tasks, clarifying goals), identifying potentially lower quality production lots in a manufacturing environment, measuring the effects of skills training, and personal informatics for improving a worker's own productivity.

22 Claims, 7 Drawing Sheets

(56) References Cited

U.S. PATENT DOCUMENTS

| | | | | |
|---|---|---|---|---|
| 2012/0089553 | A1* | 4/2012 | Mollicone | G06N 7/005 |
| | | | | 706/52 |
| 2013/0006064 | A1* | 1/2013 | Reiner | A61B 5/0022 |
| | | | | 600/300 |
| 2013/0012790 | A1* | 1/2013 | Horseman | A61B 5/0002 |
| | | | | 600/301 |
| 2013/0089851 | A1* | 4/2013 | Drane | G09B 19/00 |
| | | | | 434/362 |
| 2015/0046233 | A1* | 2/2015 | Srulowitz | G06Q 10/06398 |
| | | | | 705/7.42 |
| 2017/0200112 | A1* | 7/2017 | Liu | G06Q 10/063114 |
| 2017/0256173 | A1* | 9/2017 | Burford | G09B 5/06 |
| 2018/0032944 | A1* | 2/2018 | Sarvana | G06Q 10/063114 |

OTHER PUBLICATIONS

S. C. Müller and T. Fritz, "Stuck and Frustrated or in Flow and Happy: Sensing Developers' Emotions and Progress," 2015 IEEE/ACM 37th IEEE International Conference on Software Engineering, Florence, 2015, pp. 688-699. doi: 10.1109/ICSE.2015.334 URL: http://ieeexplore.ieee.org/stamp/stamp.jsp?tp=&arnumber=7194617&isnumber=7194545.

Ane Alberdi, Asier Aztiria, Adrian Basarab, Towards an automatic early stress recognition system for office environments based on multimodal measurements: A review, Journal of Biomedical Informatics, vol. 59, 2016, pp. 49-75, ISSN 1532-0464, http://dx.doi.org/10.1016/j.jbi.2015.11.007.

* cited by examiner

SYSTEMS AND METHODS FOR PHYSIOLOGICAL SENSING FOR PURPOSES OF DETECTING PERSONS AFFECTIVE FOCUS STATE FOR OPTIMIZING PRODUCTIVITY AND WORK QUALITY

BACKGROUND OF THE INVENTION

Technical Field

The disclosed embodiments relate in general to systems and methods for physiological sensing for purposes of detecting worker's affective focus state for optimizing productivity and work quality.

Description of the Related Art

Workers must manage their attention and focus in order to work productively. However, it is common for workers to vary in their focus level throughout the workday due to various factors. In particular, workers often work most productively and effectively when the difficulty of their tasks are well matched with the worker's skill level and their personal/environmental context. With this balance, workers can achieve a sense of focus or an affective sense of "flow", the feeling that the worker's mind is fully immersed and actively engaged in the task that is worthwhile and challenging (but within reach).

In contrast, performing tasks that are constantly too difficult may lead to anxiety, which is linked to poor health, increased medical costs, poor work quality, and days of missed work/productivity. Performing tasks that are constantly too easy may lead workers to experience boredom at work and feel disengaged with their work/company leading to carelessness or poor worker retention. Identifying these conditions would be useful for enabling management to assign the right tasks to the right employee, provide evidence for additional skills training to particular workers, and help individual workers take breaks (or other interventions) that can restore their focus, and identify when work quality may be low due to a lack of focus.

Current methods to measure worker's affective focus state require asking the worker to self-report, which can be infrequent, disruptive, and not always feasible in the workplace. Conventional technology further explored the use of somewhat invasive physiological sensor such as electrocardiography (EKG) and electroencephalography (EEG), which require applying contact leads to the skin or scalp. Having a more continuous, less obtrusive measure of a worker's affective focus state would provide useful data for a variety of applications to improve worker quality and productivity.

SUMMARY OF THE INVENTION

The embodiments described herein are directed to methods and systems that substantially obviate one or more of the above and other problems associated with conventional methods for measuring person's affective focus state.

In accordance with one aspect of the inventive concepts described herein, there is provided a computer-implemented method, the method being performed in a computerized system incorporating a plurality of sensors and a central processing unit, the computer-implemented method involving: using the plurality of sensors to sense a plurality of physiological parameters of a worker; using the central processing unit to aggregate the sensed plurality of physiological parameters of the worker; using the central processing unit to extract a plurality of psychological data features from the sensed plurality of physiological parameters of the worker; and using the extracted plurality of psychological data features in conjunction with a predictive model to predict the worker's focus state.

In one or more embodiments, the generated model is a generalized model.

In one or more embodiments, the generated model is a personalized model.

In one or more embodiments, the method further comprises receiving self-reported focus state of the worker, wherein the generated model for predicting the worker's focus state is additionally based on the received self-reported focus state of the worker.

In one or more embodiments, the method further comprises prompting the worker based on the sensed plurality of physiological parameters of the worker.

In one or more embodiments, the method further comprises using the predicted the worker's focus state to recommend an action to the worker.

In one or more embodiments, the recommended action is a break.

In one or more embodiments, the method further comprises evaluating an effect of the break.

In one or more embodiments, the method further comprises using the predicted the worker's focus state to enable or disable notification to the worker.

In one or more embodiments, the method further comprises using the predicted the worker's focus state to change availability status of the worker.

In one or more embodiments, the plurality of sensors comprises wearable sensors.

In one or more embodiments, the plurality of sensors comprises ambient sensors.

In one or more embodiments, the plurality of sensors comprises environmental sensors.

In one or more embodiments, the method further comprises using the predicted the worker's focus state to provide personalized prompts to the worker to maintain the focus state.

In one or more embodiments, the method further comprises using the predicted the worker's focus state to manage the worker's access to non-work-related applications.

In one or more embodiments, the method further comprises using the predicted the worker's focus state to configure goal-setting, planning or reflection applications.

In one or more embodiments, the method further comprises reporting the predicted the worker's focus state to a manager using a management dashboard.

In one or more embodiments, the reporting of the predicted the worker's focus state is performed in conjunction with production information associated with the worker.

In one or more embodiments, the method further comprises flagging a predetermined production output associated with the worker based on the predicted worker's focus state.

In one or more embodiments, the method further comprises evaluating a training received by the worker based on the predicted worker's focus state.

In one or more embodiments, the method further comprises altering a work environment of the worker based on the predicted worker's focus state.

In accordance with another aspect of the inventive concepts described herein, there is provided a non-transitory computer-readable medium embodying a set of computer-executable instructions, which, when executed in connection with a computerized system incorporating a central processing unit and a plurality of sensors, cause the computerized system to perform a method involving: using the plurality of sensors to sense a plurality of physiological parameters of a worker; using the central processing unit to aggregate the sensed plurality of physiological parameters of the worker; using the central processing unit to extract a plurality of psychological data features from the sensed plurality of physiological parameters of the worker; and using the extracted plurality of psychological data features in conjunction with a predictive model to predict the worker's focus state.

In accordance with yet another aspect of the inventive concepts described herein, there is provided a computerized system incorporating a central processing unit, a plurality of sensors and a memory, the memory storing a set of computer-readable instructions causing the computerized system to perform a method involving: using the plurality of sensors to sense a plurality of physiological parameters of a worker; using the central processing unit to aggregate the sensed plurality of physiological parameters of the worker; using the central processing unit to extract a plurality of psychological data features from the sensed plurality of physiological parameters of the worker; and using the extracted plurality of psychological data features in conjunction with a predictive model to predict the worker's focus state.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

Figure 1:
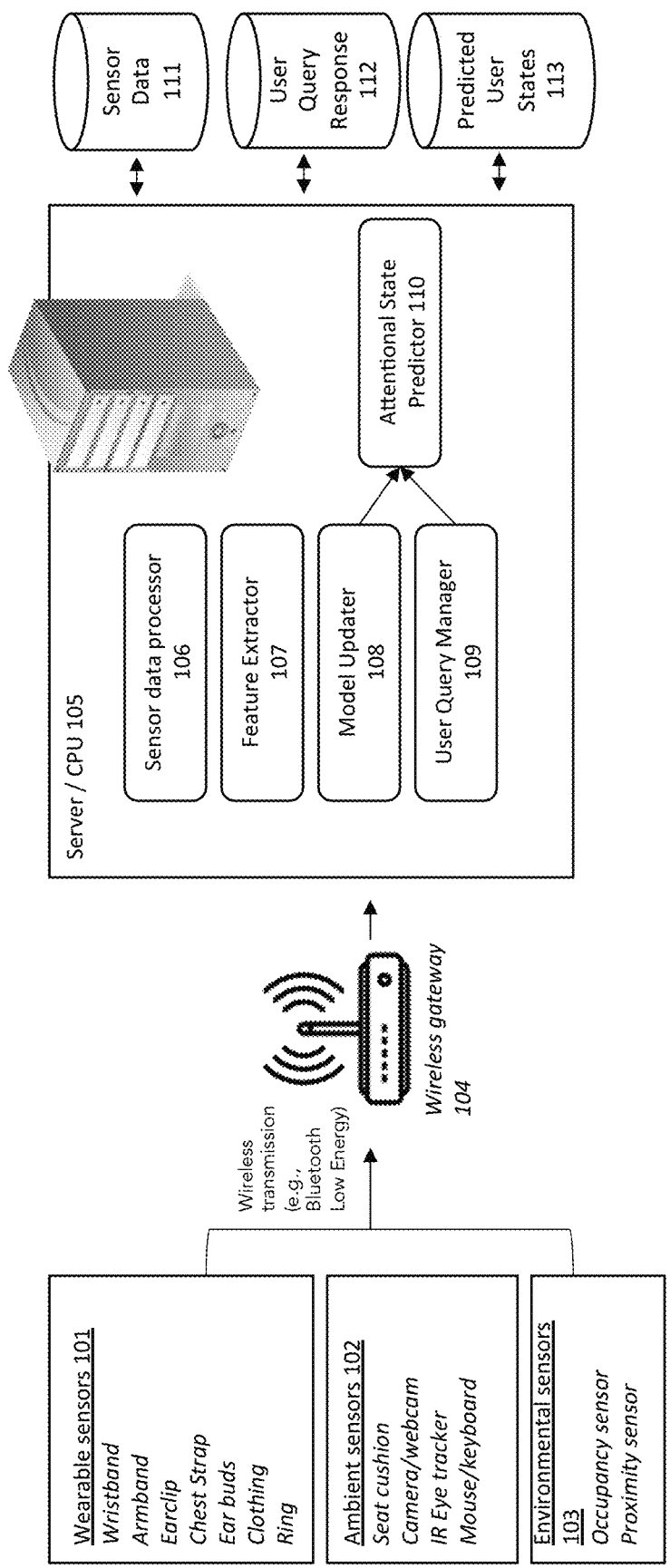
FIG. 1 illustrates an exemplary embodiment of a system for physiological sensing for purposes of detecting worker's affective focus state for optimizing productivity and work quality.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a solution that infers and detects how focused a worker is on his/her work tasks, based on physiological parameters collected using wearable and environmental sensors. The described embodiments (with or without personalization) are able to identify whether a worker is in a focused state of flow, the affective state in which the worker's mind is fully immersed and actively engaged in their task, which typically occurs when there is a balance between the worker's skill level and the difficulty of the task. The described embodiments can also identify whether the worker might be in state of anxiety (such as when the task demands/difficulty is too high relative the worker's skills) or a state of boredom (such as when the task is too easy).

In one or more embodiments, once a worker's focus state is detected, the information can be used in various applications for optimizing the worker's tasks and work quality such as monitoring task mastery, interventions to improve worker focus (e.g., recommending breaks, reassigning tasks, clarifying goals), identifying potentially lower quality production lots in a manufacturing environment, measuring the effects of skills training, and personal informatics for improving a worker's own productivity.

In one or more embodiments, the inventive methodology involves measuring various physiological signals of a worker using wearable, ambient, and environmental sensors, from which the described system can infer a worker's affective focus state, and provide worker status information to management or for the worker's own personal reflection and intervention. The physiological data is captured in real time as workers are performing their work tasks, a machine learning model is used to make a prediction about the worker's focus state, and the resulting state information is sent to a dashboard or other end-user applications to be displayed and acted upon by the worker or manager.

FIG. 1 illustrates an exemplary embodiment of a system for physiological sensing for purposes of detecting a worker's affective focus state for optimizing productivity and work quality. In the shown embodiment, a worker's physiological parameters are collected using various wearable, ambient and environmental sensors 101, 102 and 103, respectively. In various embodiments, the worker-wearable sensors 101 may include, without limitation, wristband-mounted sensor(s), armband-mounted sensor(s), earclip sensor(s), chest strap sensor(s), sensor ear bud(s), clothing-mounted sensor(s) and/or ring sensor(s). The ambient sensors 102 may include, without limitation, seat cushion sensor(s), camera/webcam(s), infrared (IR) eye tracker(s) and/or mouse/keyboard. Finally, the environmental sensors 103 may include, without limitation, occupancy sensor(s)

and/or proximity sensor(s). It should be noted that the above-described sensor types are exemplary only and may other types of now existing or future developed sensors may be used in connection with the described system for physiological sensing for purposes of detecting worker's affective focus state for optimizing productivity and work quality. Therefore, the described invention is not limited to any specific sensor types or configurations.

In one or more embodiments, the various sensors 101, 102 and 103 are configured to collect various sensor data and transmit the collected data to a server 105. In various embodiments, the aforesaid data transmission may be performed using a wireless (WIFI or Bluetooth low energy) gateway 104. Alternatively, any other data transmission protocol may be used.

In one or more embodiments, the server 105 executes a sensor data processor 106, which aggregates and synchronizes the received sensor data. In addition, the server 105 executes a feature extractor 107, model updater 108, user query manager 109 as well as attention state predictor 110. In the course of its operation, the server 105 uses sensor data 111 supplied by the aforesaid sensors 101, 102 and 103 as well as user query response data 112. As the result, the server 105 generates predicted user states 113.

Figure 2:
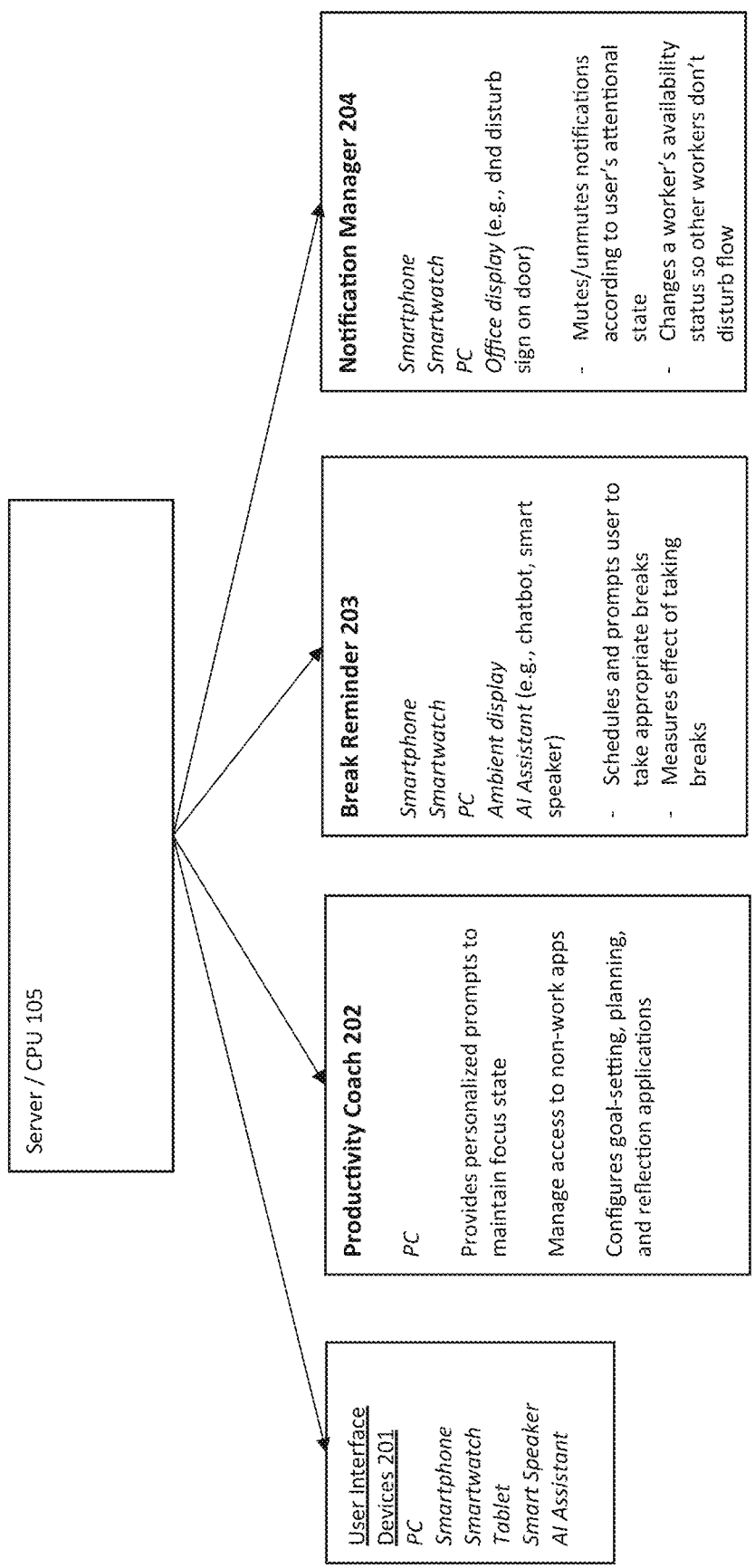
FIG. 2 illustrates various peripheral devices usable in connection with an exemplary embodiment of a system for physiological sensing for purposes of detecting worker's affective focus state for optimizing productivity and work quality.

FIG. 2 illustrates various peripheral devices usable in connection with an exemplary embodiment of a system for physiological sensing for purposes of detecting worker's affective focus state for optimizing productivity and work quality. Specifically, the server 105 described above may be in communication with and operate in conjunction with one or more of the following peripheral devices. Specifically, user interface devices 201 may be provided to provide information to the worker and receive worker's responses and/or commands. The user interface devices 201 may include, without limitation, a personal computer(PC), a smartphone, a smartwatch, a tablet computer, a smart speaker and/or an artificial intelligence (AI) assistant.

Additionally or alternatively, in one or more embodiments, there may be provided a productivity coach 202, which may be implemented using a personal computer (PC). In various embodiments, the productivity coach 202 provides personalized prompts to the worker to maintain focus state of the worker, manages worker's access to non-work-related applications and configures goal-setting, planning, and reflection applications for the worker.

In one or more embodiments, further provided may be a break reminder 203, which may be implemented based on a smartphone, smartwatch, PC, ambient display or AI assistant, such as chatbot or smart speaker. The break reminder 203 may operate to schedule and prompt user to take appropriate breaks as well as to measure effect of taking those breaks.

In one or more embodiments, further provided may be an notification manager 204 configured to mute or unmute notifications according to user's attentional state and change a worker's availability status so other workers do not disturb the worker's flow. The aforesaid notification manager 204 may be implemented based on a smartphone, smartwatch, PC and/or office display, such as a do not disturb sign on worker's office door.

Figure 3:
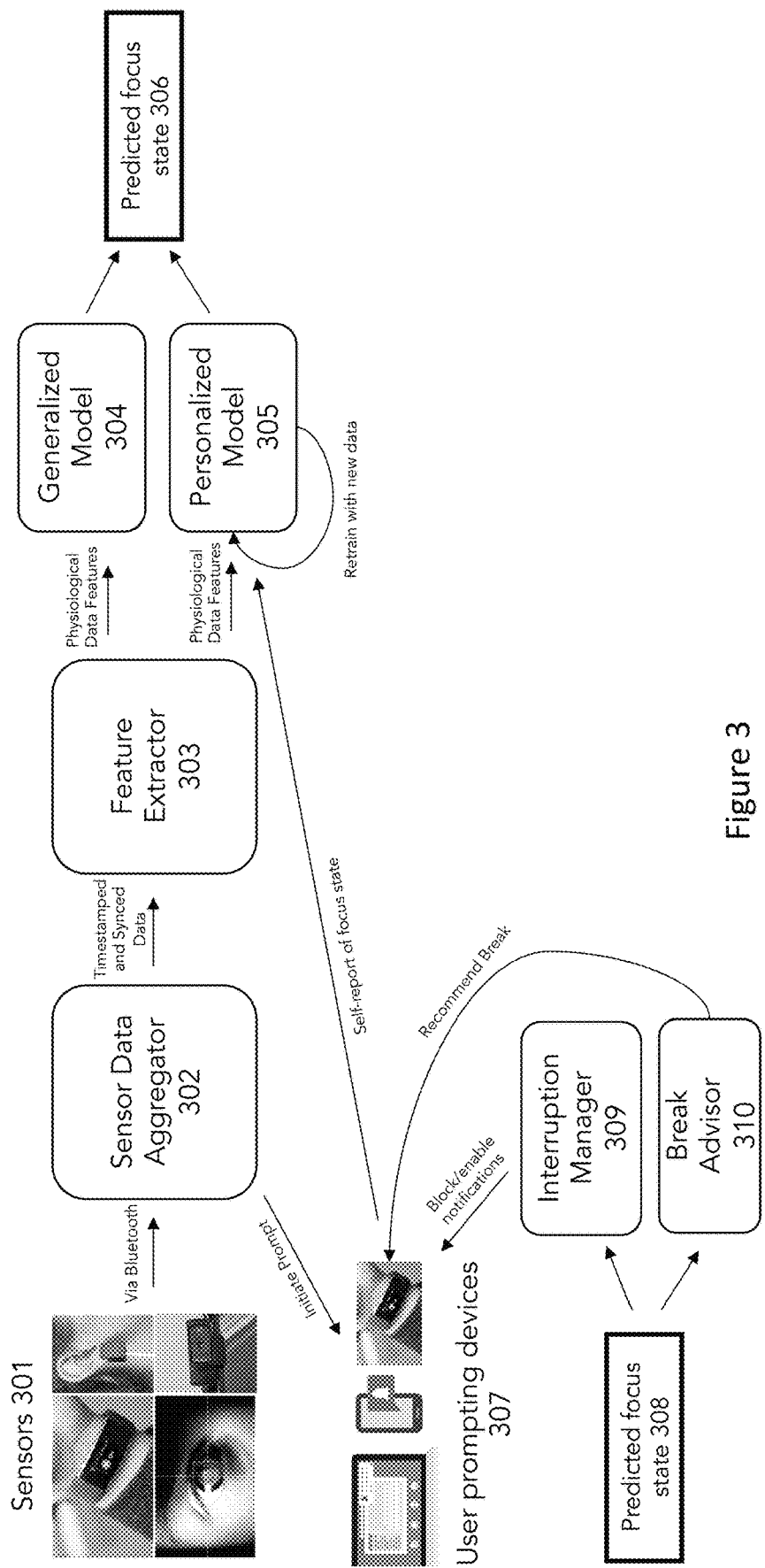
FIG. 3 illustrates an exemplary embodiment of a flowchart of an embodiment of a method and system for physiological sensing for purposes of detecting worker's affective focus state for optimizing productivity and work quality.

FIG. 3 illustrates an exemplary embodiment of a flowchart of an embodiment of a method and system for physiological sensing for purposes of detecting worker's affective focus state for optimizing productivity and work quality. First, worker's physiological signals are sensed using a combination of wearable and environmental sensors 301. Subsequently, the collected sensor data is aggregated and synchronized using the sensor data aggregator 302. After that, psychological data features are extracted from the sensor data using a feature extractor 303. The extracted psychological data features are used to train a generalized model 304 or personalized model 305, which are used to infer the worker's focus state 306 based on physiological features. In one or more embodiments, the aforesaid personalized model of focus state may be built by prompting the user to self-report their focus state as they perform their work tasks and updating the model based on new responses received from the user. The determined worker's focus state 308 and patterns thereof may be displayed using an informational dashboard. Finally, the worker's focus state information is used to alter the worker's environment or prompt the worker using the user prompting devices 307 by means of the interruption manager 309 and break advisor 310.

As would be appreciated by persons of ordinary skill in the art, the concept of 'flow' comes from the field of positive psychology. Flow is defined as the subjective feeling when one is fully immersed and absorbed in an activity with increased attention, concentration, and feelings of control. Experiencing flow at work has been shown to correlate with greater creativity, motivation, and job satisfaction. More specifically, the following nine elements are associated with a flow-like state:

(1) challenge—skill balance (the task is challenging but matched in difficulty to the skill of the person);

(2) action—awareness merging (actions feel automatic, and few or no attentional resources are required for executing action sequences);

(3) clear goals;

(4) unambiguous feedback;

(5) high concentration;

(6) sense of control;

(7) loss of self-consciousness (self-reflective thoughts and fear of social evaluation are absent);

(8) transformation of time (time may seem to move either faster or slower than usual); and (9) autotelic experience (performance is accompanied by positive affect, which may be part of an intrinsic reward response—that is, performing the task becomes a goal in itself).

One of the strongest prerequisites for experiencing flow is having a balance between the skills of the worker and the challenge of their work task. For example, a factory worker who is trained/skilled in performing a particular assembly task that he/she perceives as challenging (but too challenging beyond their skills) is more likely to experience the sense of flow when performing their work. In contrast, if the highly trained worker is assigned to perform a task that he/she perceives as too easy (which does not require the worker to exercise their more advanced skills), then the worker is more likely to experience boredom rather than flow. If a low-skill worker or a novice worker is assigned a task that he/she perceives as being too difficult, the worker is more likely to experience anxiety and stress as the task demands may be too high for their skill level. Thus, balancing the worker's skill and task challenge is critical for workers to feel the sense of flow in their work.

As would be appreciated by persons of ordinary skill in the art, it is not always easy to measure the skills of workers or the worker's perceived difficulty of the task. However, we can measure the physiological responses triggered when a worker performs tasks, and there can be physiological patterns that are correlated with different focus states like flow/boredom/anxiety.

Physiological Data Sensing, Aggregation, and Feature Extraction.

One or more embodiments described herein use a combination of wearable sensing and environmental sensing to capture physiological signals that are related to a worker's focus state. The particular sensors used must be appropriate for the work environment (e.g., the office for an information worker or the factory floor for a factory worker). Sensors must be unobtrusive and not interfere with carrying out work and also capture physiological data relatively continuously as workers focus states may change over time.

One embodiment of this invention can use wearable sensors such as the Microsoft Band 2, well known in the art, that can detect a worker's heart rate, heart rate variability, electro-dermal activity, skin temperature, and movement of hand(s). One or more embodiments can also use heart rate sensor that is worn on or in the ear or upper arm, in the case where a wristband form factor is not feasible due to too much limb movement while performing work tasks. Additional wearable sensors that can estimate the worker's muscle activity, blood-oxygen saturation and blood glucose level can also be used in other embodiments.

In one or more embodiments, other non-wearable sensors (such as a webcam with specialized software or an eye tracker) can also be used to collect physiological signals such as the worker's pupil size and pupil movements as well as the worker's respiration rate or heart rate, particularly if the worker remains mostly stationary at their workstation where a webcam can be mounted towards the worker's face.

It should be noted that while certain specific sensors were described herein for illustrative purposes, any other suitable wearable or non-wearable sensors could be used in connection with the concepts described herein and, therefore, the invention is not limited to the exemplary sensors identified in this description.

In one or more embodiments, the sensor data from different sensor sources are transmitted to a sensor gateway (e.g., a mobile device, a computer, or a server) where the data are aggregated and assigned synchronized timestamps. The raw physiological data are then cleaned, using, for example, one or more of the following steps.

In one or more embodiments, ectopic correction of interbeat intervals for heart rate in which successive interval lengths that differ by a certain percentage (e.g., 20%) are removed from the data because these beats are considered noise. Additionally or alternatively, pupil data where only one or no eyes are detected (due to sensor error or worker head pose out of range) is removed to eliminate invalid data.

In one or more embodiments, electro-dermal activity (EDA) conductance values that are out of feasible ranges for human skin conductance are removed to eliminate noise. Additionally or alternatively, electro-dermal conductance patterns that are indicative of a motion artifact instead of actual changes or spikes in EDA are removed and missing data is interpolated.

Subsequently, one or more of the following features are computed based on the cleaned data. In one or more embodiments, heart rate variability features are calculated by analyzing the time domain (e.g., mean of RR intervals, root mean square differences of intervals, etc.) and frequency domain (e.g., total power, low frequency, high frequency, etc). Moreover, in one or more embodiments, normalizing the left and right pupil diameters is performed for an individual over a larger data interval or a baseline data set and then the average of the normalized left and right pupil diameters is determined. Furthermore, in one or more embodiments, the average and variance in electro-dermal activity is determined over an interval.

Yet additionally, in one or more embodiments, the number of skin conductance responses (i.e. peaks) over an interval is calculated. Peaks can be identified by first calculating the first-order derivative of the signal and looking for zero-crossings. Derivative signals that cross from negative to positive can indicate the beginning of a peak event and a crossing from positive to negative can indicate the actual peak response level in the original signal. Setting the threshold for the amplitude of a peak based on the worker's range of previous electro-dermal activity, where for a smaller threshold can be used for workers who exhibit very small ranges in their EDA.

Predicting a Worker's Focus State

In one or more embodiments, the features derived from the sensed and cleaned physiological data can be fed into a machine-learning model that has been trained to predict a worker's focus state. In one or more embodiments, different models can be used to output different classifications depending on the particular use case:

Flow state vs. Non-flow state
Anxiety state vs. Non-Anxiety state
Bored state vs. Non-bored state
Idle state vs. Non-idle state
Flow state vs. Bored state vs. Anxiety state In one or more embodiments, the machine-learning model can be generalized (i.e., trained on data not from the worker) to predict a typical worker's flow state. The model can also be personalized to a particular worker by incorporating data from the particular worker. Personalization will likely yield more accurate predictions because it accounts for the unique aspects of the individual worker's physiology.

In one or more embodiments, personalization of the machine-learning model requires the worker (or a trained observer) to report their focus state periodically. The system can issue prompts to the worker to report their focus state via a smartphone, smartwatch, or on the worker's computer. These prompts can have a set of quick response buttons corresponding to the user's focus state (e.g., bored, anxious, flow, idle) and intensity. These responses are associated with an interval of data temporally preceding to the response. The personalized model can use these additional instances to retrain itself, updating the relationships between the worker's physiological features and focus states, and to improve its performance.

In one or more embodiments, system prompts may alter the worker's focus state. One less reactive alternative is to prompt for labels for focus states post hoc, such as during work breaks or when the worker is not performing work tasks. To support the worker's metacognitive ability to recall their focus state during previous work periods (earlier in the day), environmental cues can be captured during work and presented with the prompt. Cues can include screenshots of the worker's computer screen, video of the worker, or ambient audio of the work area.

Exemplary Procedure for Training and Retraining the Model

In one or more embodiments, the following exemplary procedure is used for training and retraining the aforesaid model for predicting the person's focus state. As would be appreciated by persons of ordinary skill in the art, the below procedure is exemplary only and should not be construed in a limiting sense as other appropriate procedures may be also used for the stated purpose.

Data chunking: The new data will first be chunked into windows of an appropriate length based on the minimum number of samples necessary for characterizing that frame.

Any windows that do not contain the minimum number of samples for any given feature are discarded or upsampled, if appropriate. For example, calculating frequency domain statistics for heart rate variability requires a minimum number of heart beats for analysis (which should be configurable depending on the particular analysis employed). If there are fewer heart beats recorded in the window than necessary, the beats can be upsampled to the minimum count or the window can be discarded from the training data. Windows can also overlap with each other by a configurable duration. The length of the windows and the overlap are hyperparameters that can be tuned based on each user and desired temporal granularity of the prediction.

Feature calculation: A vector of features is calculated based on the sensor data from that window. Examples of features are described in the previous section. This vector is also labeled with the focus state of the user.

Standardization: The features in the vector are standardized within the data captured for that user to account for personal differences between different users. Standardization requires calculating the range of each feature for a user and mapping the raw unstandardized feature values to a standard range such as between 0 (min) and 1 (max), or where the mean is centered at 0, with 1 and −1 representing 1 standard deviation from the mean.

Model training and prediction: Labeled feature vectors are passed into a training routine such SVM or logistic regression using a stochastic gradient descent or Newton's method which minimizes the loss function between data points and the decision boundary. Predictions are made from the model by inputting a time window of features, returning class with the highest probability.

Aggregation: The model is trained with time windows of a particular size, and predictions can be somewhat dependent on the window size. For larger window sizes, we need to aggregate the predictions of smaller windows in a way that represents the prediction for the larger window. A simple approach can simply take the majority prediction of all the smaller windows to classify the larger window. A larger window can be also characterized in more detail by analyzing how the predictions change across multiple smaller windows. For example, if the first half of the larger window has predominantly one class, say "flow" and the second half has predominantly another class, say "anxiety", then the larger window can be classified as "increasing frustration". These higher-level states can be useful for applications that rely on detecting not only the current state but also how states change over time.

Reinforcement: The system can personalize its performance to the specific parameters of a user. The system can send out prompts to the user to self-report their attentional state. The prompts can be sent to a user interface device such as a mobile phone, workstation computer, smart watch, or smart speaker. The responses to the prompts are used to label the windows of data temporally preceding the prompt. The labeled windows are used according to the above steps to retrain the model. The timing and context of the prompts can be customized by the system as well. For example, the schedule for prompts can be semi-regular and periodic to cover most of the day. The schedule can be triggered by contextual events as captured by the user interface device. For example, a smart watch or smart phone can detect when the user has been sedentary for a while and can prompt users during those moments. The system can also be triggered based on user interactions with the user interface device. For example, prompts can be triggered after the user launches particular applications on a workstation computer or smartphone. The modality of the prompts can also change depending on the context. For example, if the user is already using the smartphone, then the prompt can be presented on the smartphone. The quickness of the user's response (or lack of response) can also determine whether the future prompts should be presented in that same context. Furthermore, the system can also use the uncertainty of predictions to decide when to prompt. For example, a prompt can be issued when current conditions match instances whose values are very close to the decision boundary between two attentional states. It is likely that additional labeled instances can provide additional information useful for improving the classification and detection of attentional states. Thus, the routine used to trigger a prompt for self-reporting attentional state can (and should) be customized and driven by the system to 1) gather additional instances to learn from and 2) minimize the disruption to the user.

Use Case 1: Managing Work Interruptions and Breaks with Focus State

In one or more embodiments, the focus state prediction of the worker can be used to improve the working conditions of an individual worker, helping him/her achieve or maintain a state of focus on their work, which can make them more productive.

In one or more embodiments, the Interruption Manager module of the system can use focus state prediction of the worker to block or enable access to certain non-work applications/websites and notifications from email, text messages, Slack, etc. For example, if a worker is detected to be drifting from a flow state to a boredom state, it could be advantageous to block non-work websites or distracting notifications that may draw the worker out of a state of focused flow, which could help the user maintain their focused flow state. When a worker is deeply focused state, it is likely he/she is less likely to self-distract him/herself and thus the system can enable normal notifications and free access to all websites to enable free use for work purposes.

In one or more embodiments, the Break Advisor module of the system can recommend when a worker should take a break depending on their focus state. For example, if the system detects the worker has been in an anxiety state for a certain time period, the system could recommend the user to take a break to lower their stress levels. The module could also recommend the user to a break when they are bored and recommend concrete work steps to enter into a focus state when returning from a break. The Break Advisor can use focus state predictions by the system to measure the impact breaks, that is, whether (or how quickly) the worker is able to enter into a focused flow state after the break.

Use Case 2: Managing Task Assignments and Work Quality with Focus State

Knowing the focus state of a worker during a work task can help managers better understand how well suited the worker's skill level is suited for the work tasks. For example, a newly trained employee may initially feel anxious on the newly learned task but may slowly transition to a state of focused flow once they build more practical skill and experience. Workers who have been performing the same task for a long period may experience boredom as the task has become too easy and may lead to errors as the worker loses focus on the task due to a need for more stimulation. Thus, assigning a more challenging task may make the best use of this worker's abilities. A physiologically derived focus state can be an indicator for how well a worker has mastered a task.

Figure 4:
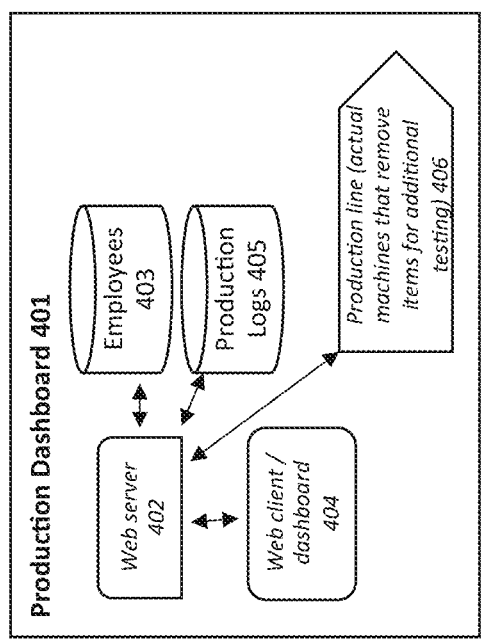
FIGS. 4, 5 and 6 illustrate exemplary embodiments of a management dashboard.
Figure 5:
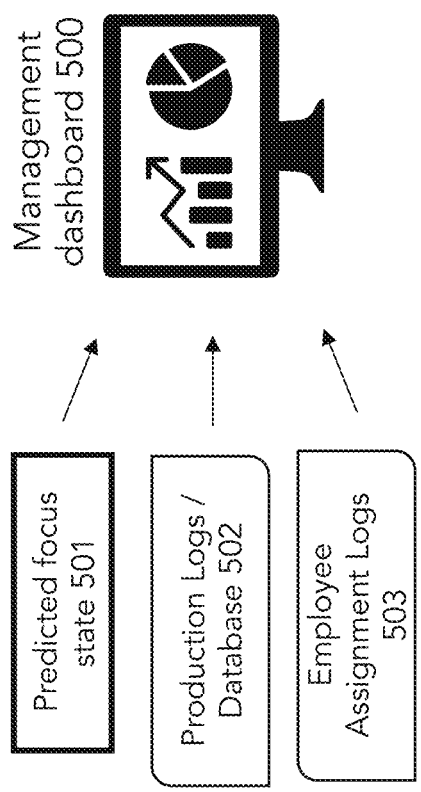

Consider the case of a manager in charge of workers on a factory line. When workers on the line lose their focus or become distracted (either due to an internal or external distraction), they may make more errors and the quality of their work will decrease. The manager can receive near real-time indicators for each worker's focus state via a management dashboard, exemplary embodiments of which are shown in FIGS. 4 and 5. As shown in FIG. 4, the aforesaid dashboard 401 is implemented based on a web server 402, which is accessed using a web client/dashboard 404. The web server uses the employee data, including employee assignments, 403 as well as production logs 405. Finally, the web server 402 may interface with the actual production line 406.

Figure 6:
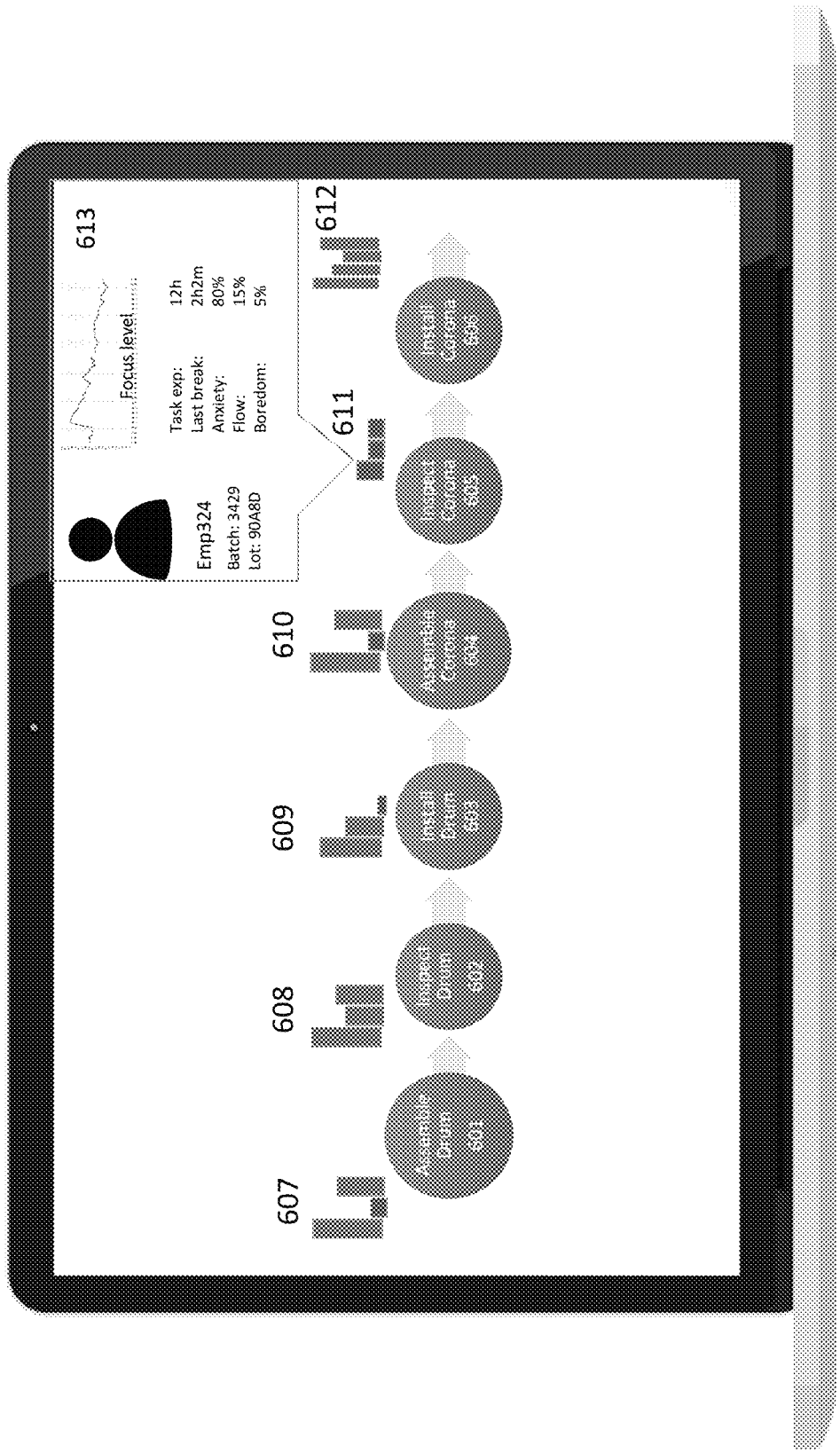

The management dashboard 500 shown in FIG. 5 receives the predicted focus state information 501, production log database data 502 as well as employee assignment logs 503 and displays this information to the production manager. The dashboard can show both the current focus state as well as the history of the focus state for each employee on the factory line, see FIG. 6, which is an example of a dashboard showing the focus state 607-612 of the workers at different stations 601-606 of a production line. Hovering over a worker's focus rating (611) shows details 613 for that worker. The dashboard can also generate reports summarizing a worker's focus level, productivity, and task assignment over a particular time period (e.g., daily, weekly, monthly, annually). The reports can be used by managers to assess the employees fit for the task and need for additional training or used by workers themselves to self-evaluate their own productivity at work.

Managers can act on instances of low focus for particular workers by having them take a break, switch roles on the line, or simply monitoring their actions or output more closely to spot errors. The system can keep track of a worker's focus state while performing different roles/tasks 601-606 on the line and recommend to managers which tasks a worker tends to be most focused in and which he/she might need additional skills training or experience to enter into a flow state. Managers can also use the predicted focus states of workers to measure the impact of adjusting the worker's work environment (e.g., introducing new tools, new procedures, new teams) on the worker's ability to concentrate and focus on their work.

Because each worker is concretely assigned a particular function on the line, which corresponds to a particular component that is part of the final assembly, a manager can use the focus state of worker(s) assigned to a component as an indicator for the potential quality of the assembled component. For example, if the dashboard reveals that a set of workers responsible for a particular component had all had a low level of focus on one morning, then that production lot can be tagged and assigned for additional quality assurance testing and verification. Instead of only selecting items randomly from the line to be tested (as is common practice today), a production system can be select those items that correspond to moments when workers were measured to have a low or variable level of focus, which is often a potential source of manufacturing errors.

A lab study was carried out to measure the physiological responses of workers to tasks that were designed to induce different focus states. The data collected from the study was used to build machine-learning models to predict the focus state of workers as they performed (office) work tasks.

Participants in the lab study (all researchers) were instructed to perform three different tasks that differed in their skill/challenge balance: editing a spreadsheet ("too easy" which led to feelings of boredom), reading patents on an unfamiliar topic ("too hard" which led to feelings of anxiety), and reading/summarizing a research paper relevant to their own work ("balanced skill and task challenge" which corresponded to a flow-like state). Each participant performed these tasks for 20-25 minutes each, in a random order. In between each task, participants rested for 3 minutes by looking at a slideshow of nature photos. After each task, participants completed a questionnaire that rated the task on its difficulty and on different characteristics of flow. The questionnaire responses showed that the tasks had the intended manipulation effect with the research paper task being the most flow-like than the others, the patent task was judged as too difficult and the spreadsheet tasks judged as tedious and too easy.

Physiological data was collected throughout the study using the Microsoft Band 2, a wrist-worn device that collected heart rate data, electro-dermal activity, skin temperature, and accelerometer/gyro (not include in the model). Additional heart rate data was also collected with a sensor that clipped onto the earlobe. A Tobii eye tracker was used to track the size of the participants' pupils.

Based on features derived from the raw sensor data, machine learning models using different types of classifiers (e.g. SVM, Decision Trees, Random Forests, etc.) were developed to identify various focus states. Preliminary results with an initial set of features and model parameters using SVM show that the models can distinguish between flow states vs. non-flow states with an accuracy of approximately 72%. The models can distinguish between anxious vs. non-anxious states with an accuracy of approximately 80%. Rest (idle) periods can be distinguished from task periods with nearly 97% accuracy.

These preliminary results are promising as they provide the first evidence that focus states can be distinguished in workplace settings based on physiological signals.

Exemplary Computer Platform

Figure 7:
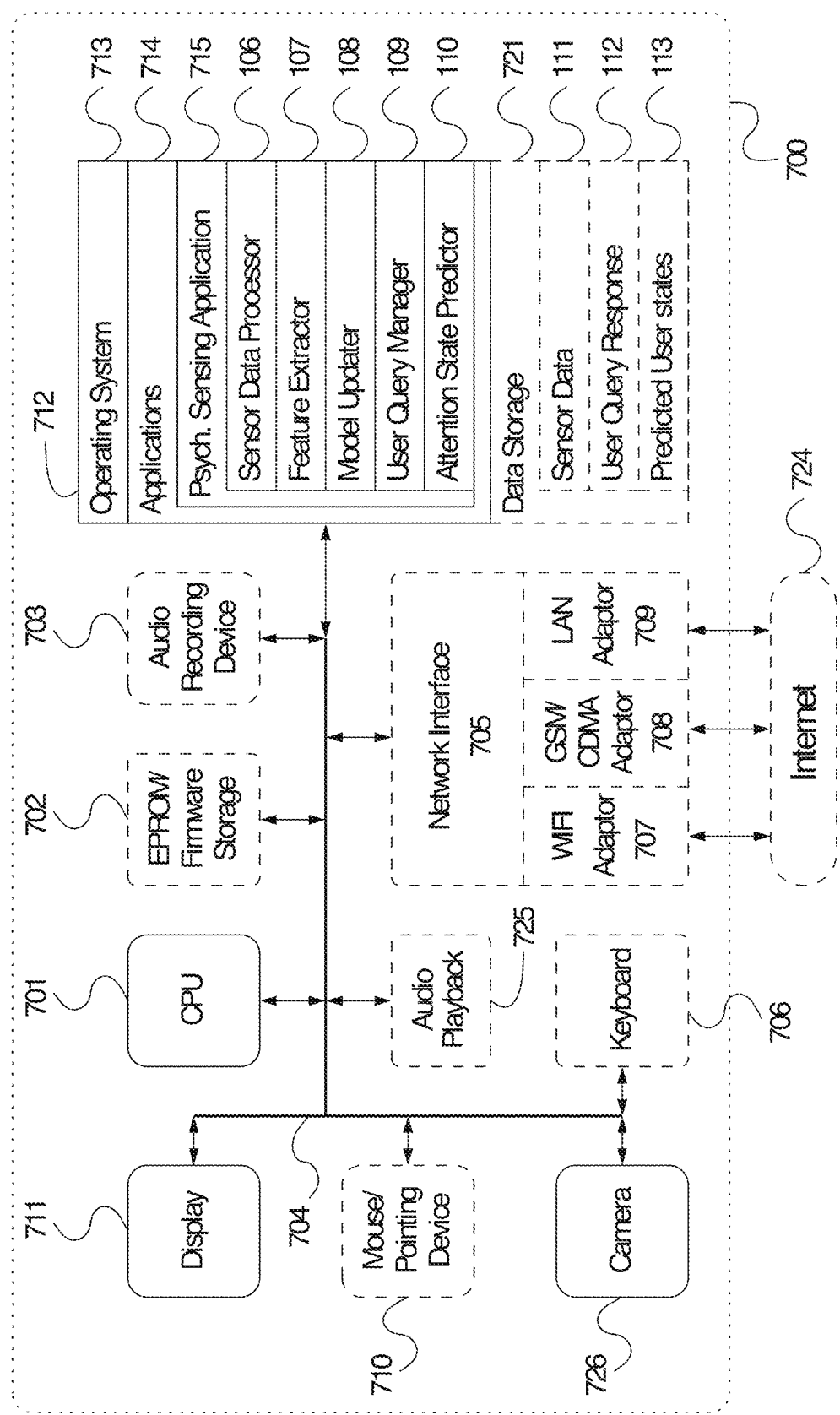
FIG. 7 illustrates an exemplary embodiment of a computerized system 700 for physiological sensing for purposes of detecting worker's affective focus state for optimizing productivity and work quality.

FIG. 7 illustrates an exemplary embodiment of a computerized system 700 for physiological sensing for purposes of detecting worker's affective focus state for optimizing productivity and work quality. In one or more embodiments, the computerized system 700 may be implemented within the form factor of a desktop computer well known to persons of skill in the art. In an alternative embodiment, the computerized system 700 may be implemented based on a laptop or a notebook computer or any other mobile computing device, such as a smartphone or a tablet computer.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 711, which may be also electrically coupled to the data bus 704, for displaying various information to a user of the computerized system 700, such as the user interfaces showing the predicted user attention state. In an alternative embodiment, the display device 711 may be associated with a graphics controller and/or graphics processor (not shown). The display device 711 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 711 may be incorporated into the same general enclosure with the remaining components of the computerized system 700. In an alternative embodiment, the display device 711 may be positioned outside of such enclosure, such as on the surface of a table or a desk. In one or more embodiments, the computerized system 700 may further incorporate an audio capture device 703, such as a microphone.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701 and for controlling cursor movement on the display 711. This input device typically has two degrees of freedom in two axes, a first axis (e.g., x) and a second axis (e.g., y), that allows the device to specify positions in a plane.

The computerized system 700 may further incorporate a web camera 726, as well as a keyboard 706, which all may be coupled to the data bus 704 for communicating information, including, without limitation, images and video, as well as user commands (including gestures) to the processor 701.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 709. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 709 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 709 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 709 send and receive electrical or electromagnetic signals that carry digital data streams representing various types of information.

In one or more embodiments, the Internet 724 typically provides data communication through one or more sub-networks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1501 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700. Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display the graphical user interface(s) on the display device 711 or perform physiological sensing for purposes of detecting worker's affective focus state for optimizing productivity and work quality. In one or more embodiments, the applications 714 may include an inventive application 715 for physiological sensing for purposes of detecting worker's affective focus state for optimizing productivity and work quality.

3. Data storage 721 may store, for example, various data structures 722 used in attention state prediction, such as sensor data 111, user query response data 112 as well as the predicted user states 113.

In one or more embodiments, the inventive application 715 for physiological sensing for purposes of detecting worker's affective focus state for optimizing productivity and work quality incorporates the sensor data processor 106, feature extractor 107, model updater 108, user query manager 109 as well as attention state predictor 110.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for physiological sensing for purposes of detecting worker's affective focus state for optimizing productivity and work quality. It is intended that the specification and examples be considered as exemplary only, with a true scope and spirit of the invention being indicated by the following claims.

What is claimed is:

1. A computer-implemented method, the method being performed in a computerized system comprising a plurality of sensors and a central processing unit, the computer-implemented method comprising:
using the plurality of sensors to receive a plurality of physiological parameters of a worker;
using the central processing unit to aggregate the plurality of physiological parameters of the worker received from the plurality of sensors;
using the central processing unit to extract a plurality of psychological data features from the aggregate of the plurality of physiological parameters of the worker;
using the extracted plurality of psychological data features in conjunction with a predictive model to predict the worker's focus state, wherein the predictive model tracks the worker's focus state while performing different tasks; and
altering a work environment of the worker based on the worker's predicted focus state, wherein an altered work environment comprises at least providing a recommended task corresponding to the worker's predicted focus state.

2. The computer-implemented method of claim 1, wherein the predictive model is a generalized model.

3. The computer-implemented method of claim 1, wherein the predictive model is a personalized model.

4. The computer-implemented method of claim 1, further comprising:
receiving self-reported focus state of the worker and training the predictive model based on the received self-reported focus state of the worker.

5. The computer-implemented method of claim 1, further comprising:
prompting the worker based on the sensed plurality of physiological parameters of the worker.

6. The computer-implemented method of claim 1, further comprising:
using the worker's predicted focus state to recommend an action to the worker.

7. The computer-implemented method of claim 6, wherein the recommended action is a break.

8. The computer-implemented method of claim 7, further comprising:
evaluating an effect of the break.

9. The computer-implemented method of claim 1, further comprising:
using the worker's predicted focus state to enable or disable notification to the worker.

10. The computer-implemented method of claim 1, further comprising:
using the worker's predicted focus state to change availability status of the worker.

11. The computer-implemented method of claim 1, wherein the plurality of sensors comprises wearable sensors.

12. The computer-implemented method of claim 1, wherein the plurality of sensors comprises ambient sensors.

13. The computer-implemented method of claim 1, wherein the plurality of sensors comprises environmental sensors.

14. The computer-implemented method of claim 1, further comprising:
using the worker's predicted focus state to provide personalized prompts to the worker to maintain the focus state.

15. The computer-implemented method of claim 1, further comprising:
using the worker's predicted focus state to manage the worker's access to non-work-related applications.

16. The computer-implemented method of claim 1, further comprising:
using the worker's predicted focus state to configure goal-setting, planning or reflection applications.

17. The computer-implemented method of claim 1, further comprising:
reporting the worker's predicted focus state to a manager using a management dashboard.

18. The computer-implemented method of claim 17, wherein the reporting of the worker's predicted focus state is performed in conjunction with production information associated with the worker.

19. The computer-implemented method of claim 1, further comprising:
flagging a predetermined production output associated with the worker based on the worker's predicted focus state.

20. The computer-implemented method of claim 1, further comprising:
evaluating a training received by the worker based on the worker's predicted focus state.

21. A non-transitory computer-readable medium embodying a set of computer-executable instructions, which, when executed in connection with a computerized system comprising a central processing unit and a plurality of sensors, cause the computerized system to perform a method comprising:
using the plurality of sensors to receive a plurality of physiological parameters of a worker;
using the central processing unit to aggregate the plurality of physiological parameters of the worker received from the plurality of sensors;
using the central processing unit to extract a plurality of psychological data features from the aggregate of the plurality of physiological parameters of the worker;
using the extracted plurality of psychological data features in conjunction with a predictive model to predict the worker's focus state, wherein the predictive model tracks the worker's focus state while performing different tasks; and
altering a work environment of the worker based on the worker's predicted focus state, wherein an altered work environment comprises at least providing a recommended task corresponding to the worker's predicted focus state.

22. A computerized system comprising a central processing unit, a plurality of sensors and a memory, the memory storing a set of computer-readable instructions causing the computerized system to perform a method comprising:
using the plurality of sensors to receive a plurality of physiological parameters of a worker;
using the central processing unit to aggregate the plurality of physiological parameters of the worker received from the plurality of sensors;
using the central processing unit to extract a plurality of psychological data features from the aggregate of the plurality of physiological parameters of the worker;
using the extracted plurality of psychological data features in conjunction with a predictive model to predict the worker's focus state, wherein the predictive model tracks the worker's focus state while performing different tasks; and
altering a work environment of the worker based on the worker's predicted focus state, wherein an altered work environment comprises at least providing a recommended task corresponding to the worker's predicted focus state.

* * * * *